United States Patent Office 2,727,929
Patented Dec. 20, 1955

2,727,929
AROMATIZATION OF CHLORINE COMPOUNDS

Herbert C. Brown, West Lafayette, Ind., and David D. Humphreys, Baton Rouge, La., assignors to Ethyl Corporation, New York, N. Y., a corporation of Delaware No Drawing. Application December 5, 1951,
Serial No. 260,102

4 Claims. (Cl. 260—650)

This invention relates to the aromatization of organic chlorine compounds and more particularly to a new and improved catalytic method for the aromatization of benzene hexachloride and similar compounds, characterized by an unusual and novel distribution of products.

The production of benzene hexachloride has become an important commercial process in the chemical industry. It has been discovered in recent years that this compound has valuable and rather unique insecticidal properties. These insecticidal properties are attributable to only one of the several stereoisomeric forms of benzene hexachloride which are produced in the additive chlorination of benzene. This particular stereoisomer, known as the gamma isomer, is present in concentrations of not more than approximately 15 per cent of the total technical benzene hexachloride product. For optimum insecticidal activity, therefore, the gamma isomer is often separated by one means or another from the insecticidally inert isomers which comprise at least 85 per cent of the total product. These inert isomers have very little commercial utility and the best way of converting them into valuable commercial products is aromatization; that is, the conversion of the alicyclic hexachlorocyclohexane compounds into benzene derivatives such as trichlorobenzenes.

In the production of technical benzene hexachloride various other products such as heptachlorocyclohexane and octachlorocyclohexane are formed in minor amounts. These products likewise are of little commercial value and their usefulness can be enhanced considerably by aromatization.

The aromatization of benzene hexachloride has been traditionally carried out by thermal treatment at temperatures in the vicinity of 275–500° C., usually in the presence of a catalyst, such as iron or ferric chloride. This is a suitable method for the preparation of trichlorobenzene. However, this procedure is inefficient in that large quantities of 1,2,3-trichlorobenzene, for which there exists no market outlet, are produced along with the desired 1,2,4- isomer. The 1,3,5- isomer is produced only in negligible amounts. The aromatization product, therefore, must be either purified by a difficult and costly fractionation operation or the crude mixture must be sold at a reduced premium. Another disadvantage of this method is that considerable carbonization of organic material takes place in the reaction zone. The carbonaceous material thereby formed is deleterious to the process in that it tends to foul process equipment, it represents a loss of potential yield of aromatization product, and it adversely affects the reaction rate and the efficiency of the catalyst employed.

Another method used for the aromatization of benzene hexachloride consists of heating the benzene hexachloride with a solution of alkali, such as sodium hydroxide or potassium hydroxide. This procedure is extremely inefficient in that the valuable hydrogen chloride produced in the aromatization process is converted by the action of the alkali into relatively valueless sodium chloride or potassium hydroxide, respectively.

A principal object of our invention, therefore, is to provide a new and improved method for the aromatization of polychlorocycloaliphatic compounds. A more particular object is to provide a new and improved method for the aromatization of polychlorocyclohexanes. Another object is to provide a catalytic process for producing mixtures of trichlorobenzenes which consists essentially of 1,2,4-trichlorobenzene with only trivial amounts of 1,2,3-trichlorobenzene as an impurity. A further object is to provide a method for the aromatization of polychlorocyclohexanes in which hydrogen chloride in high purity is produced as one of the products. Still another object is to provide a practicable means for the aromatization of heptachlorocyclohexane and octachlorocyclohexane.

We have discovered that polychlorocyclohexanes, such as benzene hexachloride, can be readily and efficiently catalytically aromatized at a high reaction velocity to yield mixtures of isomeric polychlorobenzenes by contacting the polychlorocyclohexane with a selective, highly specific catalyst, as described hereafter. In the case of benzene hexachloride, the relative amounts of 1,2,4-trichlorobenzene and 1,2,3-trichlorobenzene in the product are different than any ratio that has been obtained heretofore.

By benzene hexachloride we mean either a total stereoisomeric mixture of 1,2,3,4,5,6-hexachlorocyclohexanes, such as is produced in the additive chlorination of benzene (hereafter designated as "crude" benzene hexachloride), or any of the individual 1,2,3,4,5,6-hexachlorocyclohexane stereoisomers or any mixture of two or more of the stereoisomeric 1,2,3,4,5,6-hexachlorocyclohexanes, including a mixture such as that arising when the gamma isomer has been removed from a total stereoisomeric mixture.

Catalysts which are suitable for use in our process comprise organic salts of group VIII metals having atomic weight less than 60. By organic salts we mean salts in which one of the aforementioned metals comprises the cation and the anion is derived from an organic acid. Examples of such compounds include nickelous acetate, ferrous acetate, basic ferric acetate, cobaltous acetate, ferrous phthalate, nickelous benzoate, cobaltous benzoate, ferrous butyrate, ferrous succinate, nickelous succinate, cobaltous propionate, nickelous propionate, ferrous palmitate, nickelous p-nitrobenzoate, ferrous adipate, cobaltous stearate, nickelous maleate, ferrous oleate, ferrous 3-chlorophthalate and the like. Among these catalysts, we prefer to use the acetates since they are generally the most economical and most readily obtainable.

The amount of catalyst employed can be varied between a very low percentage, such as about 0.01 per cent of the weight of polychlorocyclohexane to about 8 per cent of the weight of polychlorocyclohexane. However, percentages greater than about 2 per cent of the weight of polychlorocyclohexane provide only minor additional benefits, so we prefer to use proportions of catalyst not greater than about 2 per cent of the weight of polychlorocyclohexane being reacted.

When we contact benzene hexachloride as herein defined at a temperature of at least 180° C. with catalytic quantities of one of the specific and selective catalysts described above, we smoothly produce mixtures of 1,2,4-trichlorobenzene and 1,2,3-trichlorobenzene in which the ratio of the commercially important 1,2,4- isomer to 1,2,3- isomer is as high as 190 per cent of the ratio obtained when old methods are used. We obtain equally advantageous results with other polychlorocyclohexanes, as enumerated herein. When benzene hexachloride is aromatized by thermal treatment in the absence of a catalyst the aromatization rates are greatly depressed below those in our process.

Our invention is operable over a wide range of temperatures. Temperatures of at least about 180° C. are preferably employed. Generally, in order to avoid excessive losses of polychlorocyclohexane by boiling, the temperature should be not higher than about 350° C. In the preferred process applications of my invention, we remove the liquid products produced by continuous distillation from the reaction mixture. Since the boiling point of 1,2,4-trichlorobenzene at normal pressures is about 213° C. and that of 1,2,3-trichlorobenzene is about 219° C., we prefer to operate at a temperature of at least about 220° C. Our preferred range of temperature, therefore, lies between about 220° C. and 350° C.

Our invention may be carried out as either a batch process or a continuous process. One variation of batch operation is described in Example I, below.

In the continuous embodiment, which is the preferred embodiment of our invention, molten or solid polychlorocyclohexane is continuously charged to a pot-type vessel or tube-type vessel containing a charge of catalyst or, alternatively, polychlorocyclohexane and catalyst can be charged concurrently. Heat is applied to the vessel, and reaction products are continuously removed and recovered from the reaction mixture by distillation and subsequent condensation. Hydrogen chloride is continuously removed and collected in a hydrogen chloride scrubber. The mixture of products which comprises the distillate is resolved by fractional distillation or other means.

The following example illustrates one mode of carrying out our invention and also points out the advantages and benefits of our invention. All parts and percentages are parts and percentages by weight in the following example.

Example I

To a reaction vessel equipped with a mechanical agitator, a temperature measuring device and a packed distillation column was charged 100 parts by weight of crude benzene hexachloride and one part of nickelous acetate. To the top of the packed distilling column was connected a condenser, a variable take-off distilling head containing a temperature measuring device, a distillate cooler, and a tared hydrogen chloride absorber containing sodium hydroxide solution. The reaction vessel was heated by controlled external means, and the agitator was started as soon as the charge was fluid enough to be stirred. The reaction was considered to have started when hydrogen chloride fumes were observed. After a substantial reflux in the distillation column was established, distillate was taken off at a rate sufficient to maintain the reactor temperature at 280–305° C. during the major part of the run. The rate of reaction was determined by periodic weighing of the amount of hydrogen chloride absorbed by the sodium hydroxide in the hydrogen chloride absorber. The 50 per cent reaction time, that is, the time required for evolution of 50 per cent of the theoretical amount of hydrogen chloride for complete conversion of the benzene hexachloride to trichlorobenzene, was used as the criterion for velocity of the aromatization reaction. The 50 per cent reaction time in this example was 38 minutes. The temperature of the vapor in the take-off head gradually rose from about 130° C. to about 212° C. during the course of the run. The yellow distillate was found by infrared analysis to comprise 39 parts of 1,2,4-trichlorobenzene and 7 parts of 1,2,3-trichlorobenzene. The ratio of 1,2,4-trichlorobenzene to 1,2,3-trichlorobenzene, therefore, was greater than 5:1.

When ferrous acetate, cobaltous acetate, ferrous phthalate, nickelous propionate and the like are used as catalysts in this procedure equally beneficial results are obtained.

When each of the above procedures is applied to alpha benzene hexachloride, gamma benzene hexachloride or the crude mixture from which gamma benzene hexachloride has been removed or to monochlorobenzene hexachloride or to dichlorobenzene hexachloride, substantially identical results are obtained.

In order that the contrast between our invention and prior means may be realized the following example presents results obtained when powdered iron is used as the catalyst.

Example II

Using the same procedure as in Example I, a mixture of 100 parts of crude benzene hexachloride and 3 parts of powdered iron was heated to a reactor temperature of 285–300° C. The ratio of 1,2,4-trichlorobenzene to 1,2,3-trichlorobenzene in the product mixture was only 2.9 to 1.

When benzene hexachloride is aromatized thermally without the addition of a catalyst the 50 per cent reaction time is slowed down to 63 minutes.

Our invention is not limited by any of the specific examples cited herein but is limited only by the claims which are appended hereto.

We claim:

1. A process for the production of trichlorobenzene having an enhanced proportion of the 1,2,4-trichlorobenzene isomer comprising contacting benzene hexachloride at a temperature of at least 180° C. with a catalytic quantity of a carboxylic acid salt of a group VIII metal having an atomic weight of less than 60, said metal being in its lower valence state.

2. The process of claim 1 wherein the temperature is between about 220° and 350° C. and the proportion of said organic salt initially present is between about 0.01% and 8% of the weight of benzene hexachloride originally present in the reaction zone.

3. The process of claim 1 wherein the metal is nickel.

4. The process of claim 1 wherein the catalyst is nickelous acetate.

References Cited in the file of this patent

UNITED STATES PATENTS

| | | |
|---|---|---|
| 2,467,123 | Fleck et al. | Apr. 12, 1949 |
| 2,569,441 | Alquist et al. | Oct. 2, 1951 |

FOREIGN PATENTS

| | | |
|---|---|---|
| 993,097 | France | July 18, 1951 |